Jan. 29, 1963 W. L. CALVERT 3,075,747
APPARATUS FOR EFFECTIVELY AGITATING VISCOUS MATERIALS
Filed Jan. 2, 1959 3 Sheets-Sheet 2
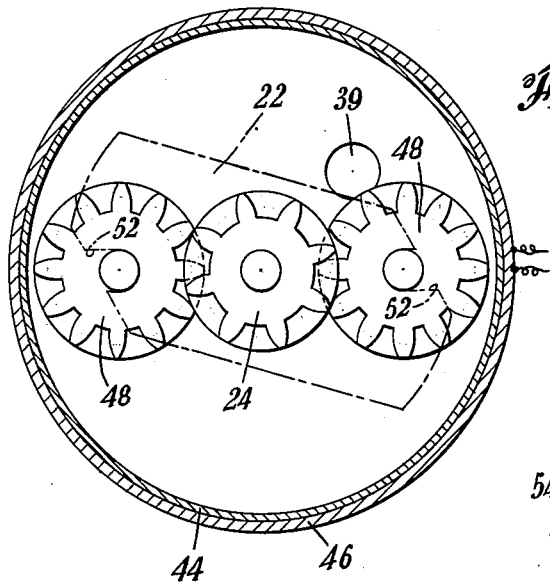
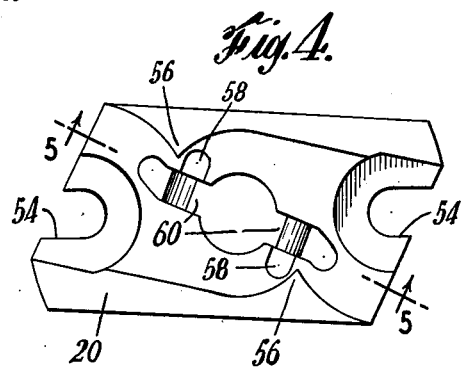
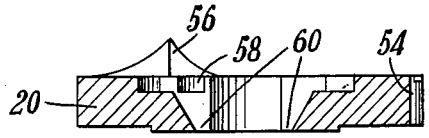
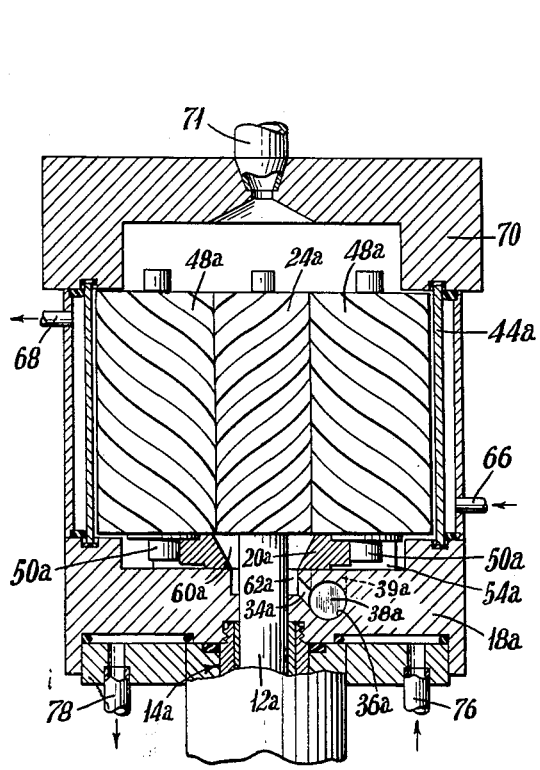
INVENTOR.
WILLIAM L. CALVERT
BY
*Walter C. Kehm*
ATTORNEY Jan. 29, 1963 W. L. CALVERT 3,075,747
APPARATUS FOR EFFECTIVELY AGITATING VISCOUS MATERIALS
Filed Jan. 2, 1959 3 Sheets-Sheet 3

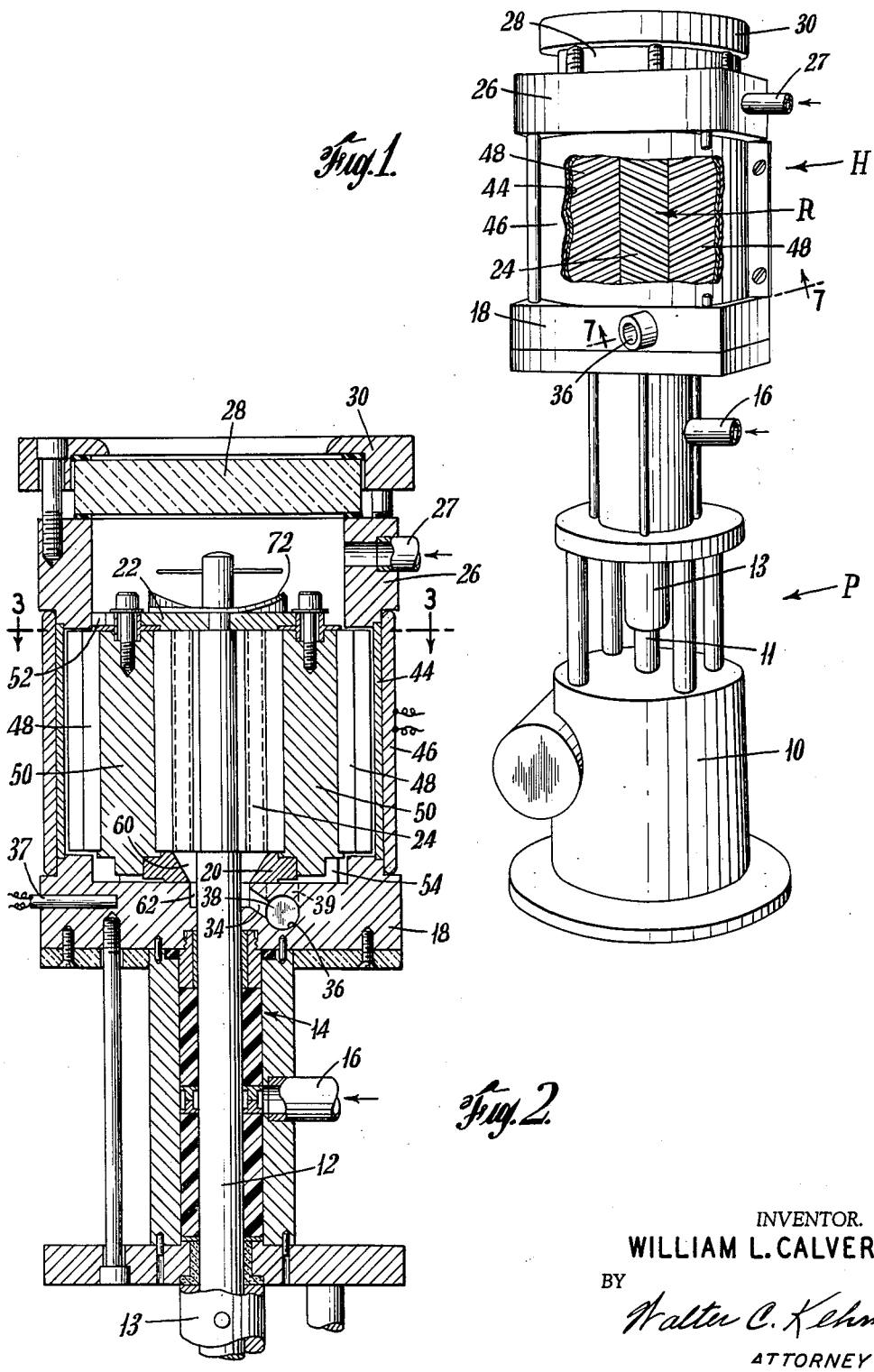

INVENTOR.
WILLIAM L. CALVERT
BY
Walter C. Kehm
ATTORNEY

United States Patent Office 3,075,747
Patented Jan. 29, 1963

3,075,747
APPARATUS FOR EFFECTIVELY AGITATING VISCOUS MATERIALS
William L. Calvert, Westfield, N.J., assignor to Union Carbide Corporation, a corporation of New York
Filed Jan. 2, 1959, Ser. No. 784,620
5 Claims. (Cl. 259—104)

This invention relates to apparatus for effectively agitating highly viscous materials and, more particularly, to apparatus wherein highly viscous materials are effectively agitated at controllable conditions of temperature, pressure and atmosphere.

The term "effective agitation," as used throughout this specification and in the appended claims, refers to one or more mechanical actions carried out on the material within the processing zone. Because the apparatus of this invention is adaptable to a wide variety of operations as hereinbelow described, "effective agitation" can connote a stripping operation, wherein effective agitation would consist in imparting sufficient energy to the material within the processing zone to supply the latent heat of vaporization of volatile components and to cause the continual exposure of new surfaces from which the entrapped volatiles can escape, as well as in operations where materials have a tendency to build up, solidify, degrade or be otherwise adversely affected by stagnation or prolonged retention in any part of the processing zone. Effective agitation consists in elimination of unswept pockets or unscoured surfaces where the material stagnates or builds up, in still other operations such as molecular weight reduction or the breaking down of gel particles, effective agitation consists in severe mechanical abuse of the material by means of intensive shearing action. The meaning, whether generic or particular, to be attached to the term "effective agitation" in the following paragraphs of my specification, will be evident from the context.

Typical of apparatus providing effective agitation of highly viscous materials, particularly polymeric material such as rubbers, plastics and the like, under some conditions are those employing a plurality of coacting rotors, such as kneaders, Banbury mills, and the like which provide sufficient movement of the milled mass to accomplish a satisfactory degree of heat transfer and material agitation throughout the processing zone to prevent local accumulation of heat and consequent charring of the material. The use of two or more rotors, however, is essential to achieve agitation of a mass of material in this type of apparatus, and a plurality of openings in the vessel walls is required to house the rotor shafts. These rotor shafts must be of comparatively large diameter to withstand large torsional and radial loads and are of necessity set close together. Such multiple rotor apparatus as the above generally requires external timing gears and often external bearings which must be set as close to the material chamber as possible in order to minimize shaft deflection. Large rotor shafts and timing gears severely limit radial and axial space available for stuffing boxes or other shaft sealing devices. Hence the problem of adequately sealing around such shafts so as to give a controlled pressure or selected atmosphere within the processing zone of the apparatus is inherently a difficult one and a satisfactory means of sealing this type of apparatus is not presently known.

Other well-known types of processing and reaction apparatus for polymeric materials and other highly viscous materials can be sealed sufficiently to provide adequate control of the pressure and atmosphere within the processing zone, but these types cannot provide effective agitation if the material to be processed is of moderate to extremely high viscosity. These apparatus employ propellers, turbines, chain stirrers, anchor stirrers and similar means which require only a single drive shaft to agitate material. With single shafts adequate sealing of the processing zone is easily achieved. It has been found, however, that clogging and stoppage of the agitating means or the rotation of a portion of the material about the shaft as a solid plug, while the remainder adheres to the vessel walls makes attempts to effectively agitate even moderately high viscosity materials unsuccessful. With presently known single shaft apparatus, stagnation of a portion of the material frequently occurs resulting in an inhomogeneity of the mass, inability to control exothermic reactions, local charring, and general failure of the agitating means to perform its proper function. A further disadvantage of these devices is the necessity of removing the processed material by a separate, and generally awkward operation since the agitating action of the apparatus does not drive the material in a particular direction which would facilitate removal thereof from the processing zone.

Still another commonly used device for blending and/or reacting materials under moderate to high pressures is that wherein the materials to be reacted are enclosed in a strong walled container or bomb. One type of bomb achieves agitation of the enclosed materials by a rocking action. Other types employ propellers or other rotors on a single shaft. Some do not agitate the enclosed materials at all. The absence of shafts extending through the vessel walls, or the presence of only one, permits the sealing of these bombs so that moderate to high pressures, reduced pressures or selected atmospheres can be employed during reaction or processing of the enclosed materials. Bombs, however, are totally inadequate in the agitation they provide if the enclosed material is of even moderate viscosity. Rocking or stirring does not agitate viscous material sufficiently to ensure adequate mixing of reactants or dispersion of materials. Also, the inability of the bomb to agitate viscous materials prevents control of the temperature throughout the viscous mass resulting in local charring and other maleffects.

The main objects of the present invention are therefore to avoid the difficulties referred to above, to effectively agitate viscous materials under any desired pressure, vacuum, or selected atmosphere, to easily control and maintain uniform the temperature throughout the mass of highly viscous material under any desired pressure, to ensure effective agitation of highly viscous materials at any desired pressure and temperature, and to easily adapt the milling apparatus to such divers operations as rapid agitation for removal of volatiles under reduced pressure, and severe mastication and/or fluxing of solid materials.

In accordance with the present invention, these and other objects are accomplished by placing material in a cylindrical housing enclosing a planetary gear arrangement having a plurality of planetary gears while subjecting the material to vigorous mechanical shearing and agitation in the zones of intermesh formed between a sun gear and each of the planetary gears and simultaneously mechanically shearing the material between the housing wall and the planetary gears in rolling contact therewith and displacing the material from the zone of intermesh by a positive pumping action.

In a more specific embodiment of the instant invention, there is provided a means for removing a portion of the material during the working for recycling within the working area, or for continuous discharge in batch or continuous operation.

To accomplish the effective agitation of the material apparatus is provided which comprises a cylindrical wall and coaxial therewith and enclosed thereby a driven sun gear and a plurality of planetary gears in mesh with the sun gear and held in relative orientation by a cross arm.

In the drawings:

FIGURE 1 is a pictorial view of one embodiment of the apparatus with a section removed to show underlying parts;

FIGURE 2 is a vertical section of the apparatus shown in FIGURE 1;

FIGURE 3 is a top view of the gears taken along the plane of line 3—3 in FIGURE 2;

FIGURE 4 is a plan view of the lower cross-arm of the apparatus;

FIGURE 5 is a vertical sectional view taken along the plane of line 5—5 of FIGURE 4;

FIGURE 6 is a vertical section of a modification; and

Figure 7:
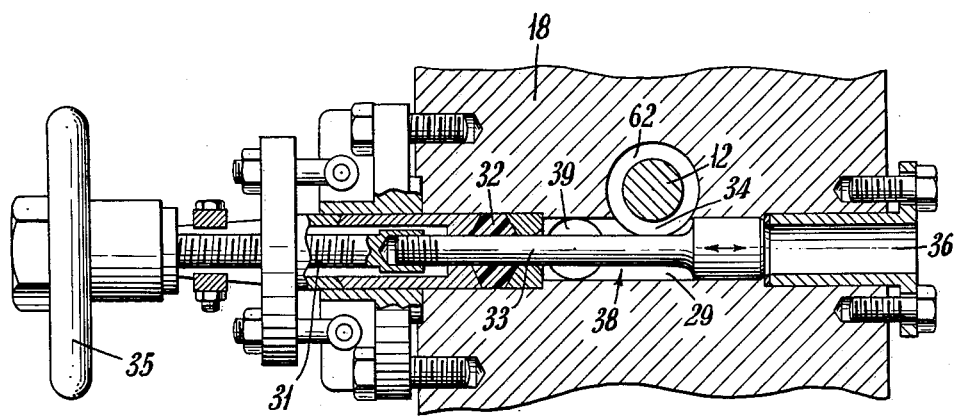
FIGURE 7 is an enlarged, horizontal, section view taken along line 7—7 of FIGURE 1.

Referring now to the drawings, the pedestal P shown in FIGURE 1 comprises a base support 10 shown as a speed reducer housing having an output shaft 11 connected to a drive shaft 12 by a coupling 13.

The drive shaft 12 passes upwardly through a closely fitted bearing and packing gland assembly 14 having a fluid packing injector 16. From packing gland assembly 14, the drive shaft 12 extends through base plate 18 and on up through lower cross arm 20 and upper cross arm 22, between which is disposed a sun gear 24 keyed on or integral with the drive shaft 12.

The housing H comprises the base plate 18, an annular top plate 26 and therebetween a cylindrical wall 44 which encloses a space surmounted by a cover plate 28 fastened to top plate 26 by clamping ring 30 to effect a tight seal at the top of the apparatus. The wall 44 is encircled by a band heater 46.

The annular top plate 26 is provided with one or more openings 27 through which solid, liquid or gaseous material can be introduced into or removed from the processing zone to alter the pressure or reaction conditions therewithin or through which any volatiles stripped from the agitated material can be drawn off. Cover plate 28 may be suitably made of either pyrex glass as shown, to permit visual inspection of the material within the milling zone, or of metal where extremely high pressures are to be employed.

The base plate 18 is suitably provided with a temperature sensing element such as a thermocouple (not shown) and heating means such as cartridge heater 37. At the center of the base plate 18 is annular recess 62 coaxial with drive shaft 12 leading into channel 34 which communicates with port 36. The port 36 can be equipped with a valve 38 to provide discharge of milled material, or retention in, and recirculation or recycling, of the milled material through the processing zone.

Of course, a simplified base block can be employed where bottom discharge is not desired, such as in the batch preparation of rubber which is generally removed in one lump through the top of the apparatus.

As shown in detail in FIGURE 7, the valve 38 comprises a stem 33 disposed in channel 29 threaded in a surrounding sleeve 31 at one end and provided with an enlarged head at the opposite end. The enlarged head is fitted to totally close off the discharge port 36. A handle 35 turning the stem 33 in threaded sleeve 31 opens the discharge port 36 and seals off the return port 39. Thus, by adjustment of the stem 33, the material entering the channel 29 from annular recess 62 through channel 34 is either passed out through discharge port 36 or recycled to the processing zone through the return port 39.

The rotor R is coaxial with the cylindrical wall 44 and the drive shaft 12, and comprises the sun gear 24, which is in mesh with a plurality of planetary gears 48. These are helical gears, and the angle shown in the drawing is 45° but gears of other helical angles can be used if desired. Likewise, planets having helical corrugations can be used if desired instead of gears, although generally they do not provide as good an agitation as do gears. Spur gears may also be used if desired as hereinafter described.

Rotation of the drive shaft 12 turns the sun gear 24 on its own axis and causes planetary gears 48 to simultaneously rotate about their respective axes and the axis of the drive shaft 12; hence, a point on the periphery of the planetary gears moves in a hypocycloidal path. The spindles 50 of the planetary gears 48 are journaled in journal boxes 52 and 54 of the lower and upper cross-arms 20 and 22 respectively. These journal boxes are open at their outer ends so that the planetary gears 48 are capable of radial movement outward to meet the cylinder walls 44 thereby trapping the thick viscous material between the teeth of the planetary gear 48 which is then mechanically worked in the intermeshing with the teeth of sun gear 24 as the planetary gears rotate.

The unique effect of the configuration of lower cross arm 20 is to provide a pumping action for the viscous material which can recirculate the material back up into the planetary gears 48 for additional working or for discharge through discharge port 36, depending upon the location of valve 38. As shown in FIGURES 5, 6 and 7, the intermeshing of the teeth of sun gear 24, with the planetary gear 48 forces a portion of the material between the teeth of the gears out into the slot 58 and down through openings 60 and thence into channel 29. With discharge port 36 closed the material is then forced back through return port 39 and into the bottom of the chamber through base plate 18. The leading edge of lower cross arm 20 can conveniently be tapered back so as to push the return material back up into the chamber so as to be reworked in the gearing arrangement.

With discharge port 36 open, the material pumped or pushed into channel 29 will then pass out port 36 rather than being recycled through return port 39.

The drive shaft 12 is journaled in the center of cross arm 22 and the spindles 50 of the planetary gears 48 are journaled at either end of upper cross arm 22, the cross arm 22 thereby being pivoted centrally on the drive shaft 12. The slot-shaped journal boxes 52 are cut in from the end of the upper cross arm 22 a sufficient distance to permit the gear teeth of the planetary gears 48 to fully mesh with the teeth of the sun gear 24. Radial movement of the planetary gears 48 away from the sun gear 24 is limited only by the wall 44. The arms of the journal boxes 52 extend outwardly far enough to retain the spindles 50 therein when the gear teeth of the planetary gears 48 are in rolling contact with the wall 44. The journal boxes 52 permit radial or translational motion of the planetary gears 48 from the sun gear 24 a distance equal to the space between the planetary gears 48 and the wall 44, which distance does not extend ½ the outward extension of the gear teeth from the gear. It should be emphasized that the planetary gears 48 operate in concert in their rotational and cycloidal motion, but they do not necessarily operate in concert in their radial motion.

The upper cross arm 22 can be fastened to the spindles 50 by cap screws or otherwise and can be removed if desired without impairing effective agitation provided by the gears.

However, the lower cross arm 20 must be retained and is critically significant in this apparatus. As shown in FIGURE 4, the lower cross arm 20 comprises a pair of journal boxes 54 and adjacent thereto, saddles 56. The saddles 56 are located at the bites to which the planetary gears 48 and the sun gear 24 converge and direct material conveyed downward by the screw flights into slots 58 from which the material passes into an orifice 60, the lower end of which communicates with the annular recess 62 in the base plate 18. The saddles 56 enhance the pressure developed by the milled material where it impinges on the lower cross arm 20 by confining material trapped in the lowest threads of the planetary gears 48 and the sun gear 24.

A top plow 72 fixed on, or integral with the drive shaft 12 and rotatable therewith is provided to keep the vapor space above the gear arrangement clear of material and thereby facilitate removal of volatiles during stripping operations and prevent build up or stagnation of material within the apparatus.

The adaptability of my apparatus to a variety of effective agitations is illustrated by the alternative embodiment shown in FIGURE 6 which is highly suited to continuous effective agitation. As shown, the apparatus can be operated while hydraulically full as is desirable in polymerization reactions, homogenizing operations, blending and similar procedures.

In detail, this embodiment comprises the drive shaft 12a driven as above by a suitable motor and effectively sealed against leakage by a bearing and packing gland assembly 14a. The drive shaft 12a extends through base plate 18a, and lower cross arm 20a. The sun gear 24a is keyed on, or integral with the drive shaft 12. In mesh with drive shaft 12a are a plurality of planetary gears 48a mounted on spindles 50a the lower ends of which are journaled in journal boxes 54a of lower cross arm 20a which keeps the gears 48a in relative orientation. The journal boxes 54a are slot-like and permit radial movement of the spindles 50a therein. Surrounding the sun gear/planetary gear arrangement is a wall 44a coaxial with the drive shaft 12a. The wall 44a limits the outward radial movement of the planetary gears 48a and prevents their moving out of mesh with sun gear 24a so that upon rotation of the sun gear 24a by the drive shaft 12a, the planetary gears 48a are caused to turn around the axis of the drive shaft 12a and simultaneously their own respective axes.

Atop wall 44a is a strong cover plate 70 which seals off the top of the processing zone. A material inlet 71 is provided in cover plate 70 to facilitate the addition of material to the processing zone either continuously or sporadically by the use of a pump, extruder, an air operated ram or other similar device.

The gear arrangement occupies all the space between the base plate 18 and cover plate 70 to ensure effective agitation during reaction of materials. In continuous operation material entering the processing zone through material inlet 71 is effectively agitated and passed out through the base plate 18a as hereinbefore described.

Temperature control of the processing zone is readily achieved by the use of water jacketing. Fluid is passed against the base plate 18a through fluid inlet 76 and passed therefrom through outlet 78. Similarly with the wall 44 fluid is passed therearound in through fluid inlet 66 and out through fluid outlet 68. It is within the scope of my invention to provide temperature control within the processing zone itself as by use of heating or cooling means within the gear structure but ordinarily this is not essential and, because of its high cost, is not generally desirable.

In operation of any of the embodiments of my invention, material or several materials such as a polycarbonate or an ethylene-propylene copolymer or other material is introduced into the apparatus from a suitable source by mechanical means such as a pump, extruder, vibrating trough and the like, or by hand. If it is desired to carry out effective agitation and/or the reaction on a continuous basis, it is highly desirable that the feed be uninterrupted and at a controlled rate. The material enters the processing zone and is caught in the bite provided by the small clearance between converging adjacent gear teeth surfaces and extruded through the clearance as a plastic sheet or ribbon which clings to the gear teeth surfaces and is torn apart as the adjacent gear teeth surfaces diverge. Portions of plastic remaining on the planetary gear teeth ridges are sheared between the wall and the gear teeth ridges and a plastic sheet or ribbon is extruded and torn apart as the gear teeth ridges and wall separate. The material is carried back around to the bite between adjacent gear teeth surfaces of the sun gear and planetary gear as the cycle is repeated.

In the tearing apart, a multitude of fine filaments are formed which bridge the crests of the diverging gear teeth ridges and the exposed surface of the agitated material is vastly increased which facilitates blending of the mass and stripping of volatiles therefrom.

Effective agitation is attained with all types of rubbery or plastic materials and may be either solid, viscous, semi-liquid and liquid, tacky or non-tacky. The agitating action described above is that occuring with tacky materials. Equivalent mechanical action provides effective agitation for other materials. The exact form of agitation is dependent upon the rheological properties of the particular material or materials.

It is a particular feature of the apparatus of my invention that as the viscosity of the material being milled increases the pressure exerted at the bites between the planetary gears and the sun gear proportionally increases; so does the pressure generated between the planetary gears and the wall. This flexibility in amount of shearing force developed is a result of the ability of the planetary gears to undergo radial or translational motion. Extremely viscous materials caught in the bite between the sun gear and the planetary gears force the planetary gears outward against the wall in an amount proportional to their viscosity; simultaneously, the material is caught between the planetary gears and the wall to force the planetary gears away from the wall inward toward the sun gear.

It is evident that the higher the viscosity of the milled material the greater the pressure generated in the bite between the planetary gear and the sun gear; and that this increased pressure results in increased outward thrust of the planetary gears against the wall. Further, as the outward thrust increases greater traction develops between the rolling planetary gear and the wall; hence greater traction is automatically provided for higher viscosity materials. This natural adjustment of shearing stress available to the shearing stress required is a chief advantage of my invention.

The above-described gear action permits advantageous apparatus design. Heretofore, the tremendous pressures developed by the viscous material within the bites between gears resulted in extremely high radial bearing loads and rotor deflection in previously known apparatus such as twin screw mills, Bakol mills, quadrotor mills and the like. My invention obviates these difficulties by means of a novel arrangement of gears whose milling action provides balanced forces so that no radial bearing loads or rotor deflection can develop.

The intensity of the shearing action obtained in my invention is partially dependent upon the clearance between the meshing gear teeth surfaces. The clearance can, of course, be varied within wide limits determined by tooth dimensions by employing an assortment of sleeves within the wall 44 which will vary the diameter of the processing zone.

In one embodiment, excess material not drawn through the gear teeth clearance is forced ahead of the axially rotating and cycloidally moving planetary gears. As the material meets the rotating gear teeth helix, it is conveyed downward and into the bite between converging sun gear teeth and planetary gear teeth and is extruded, through the fine slit developed between successive meshed gear teeth, into a thin ribbon or film. The plastic ribbon is conveyed by the planetary gear teeth into the bite between the wall and the gear teeth ridge. The build-up of viscous material on the wall is prevented by the continuous rolling contact between the wall and the planetary gear teeth ridges which shears material adhering to the wall and forces it between successive gear ridges on the planetary gear whence it is reconveyed into the bite between the sun gear and planetary gear.

The continuous agitating action forcibly conveys the milled material downward by the screw flights with a positive pumping action to impinge on the saddles 56 of the lower cross arm 20 which direct the material into the recess in the base plate 18. From the recess 62 in the base plate 18 the material enters a communicating channel 34 and is discharged through a port 36 or, if desired, reintroduced into the processing zone for further mastication. The apparatus is thus easily adapted to batch operation wherein the milled material is reworked as long as desired, then discharged through the valved port 36. The pumping action achieved by the converging of the intermeshing gear teeth of the planetary gears and of the sun gear enables the planetary rotor mill of my invention to pump itself substantially empty before shutdown.

When the mill is hydraulically full the mode of operation can comprise a continuous feed and discharge which are automatically synchronized. The motion of the effectively agitated material includes vigorous mechanical shearing; extrusion of films through four bites simultaneously, a downward conveying by the screw flights with consequent upward motion of the enclosed material in the voids between the rotors; and rolling motion about vertical axes of the masses of material in the voids between the rotors.

It is possible using the pumping action achieved by the above-described apparatus to reduce the pressure drop through the mill to zero or even to a negative value so that the discharge pressure exceeds the feed pressure. As is obvious the position of the apparatus is immaterial. Equally excellent results being achieved by the mill operated upside down, on its side, or at an angle.

The use of only one shaft entering the processing zone and not subjected to radial loads permits effective sealing thereof enabling the milling or reacting of material at greatly reduced pressures or very high pressure or optionally under an inert or other atmosphere. Of course, the drive shaft may be extended axially through the entire apparatus and driven at both ends to provide additional power but this is not ordinarily necessary.

Because the gear arrangement of the invention hereinbefore described utilizes a cross arm to maintain the planetary gears in proper orientation and the outward thrust of the planetary gears provides adequate traction between the planetary rotors and the smooth cylinder walls, there is no need to have a ring gear encircling the gear arrangement and intermeshing with the planetary gears. This is another advantage of my apparatus since ring gears are ordinarily quite costly, particularly ring gears which extend the full length of the milling zone and also since the absence of a ring gear permits a greater flexibility in gear design. It is within the scope of the present invention to employ a narrow ring gear, but it is not required for milling even the most highly viscous known plastics. With helical gears having an angle to the vertical axis of greater than 45°, a small spur gear to serve as a driving gear on each of the planets and on the sun gear is desirable. With gears having angles less than 45°, i.e., approaching and including spur gears, where there is more surface area from one single tooth of the planet contacting the cylinder walls, a small section of internal ring gear is often desirable to reduce internal chattering and wear of the gears.

What is claimed is:

1. Apparatus for agitating viscous materials comprising a base plate, a top plate and a cylindrical wall therebetween, a drive shaft coaxial with the cylindrical wall and extending centrally in said base plate, means for rotating said drive shaft, a sun gear fixed on said drive shaft, a cross arm centrally pivoted on said drive shaft between said base plate and said sun gear having spaced apart journaling means, a plurality of planetary gears mounted in said journaling means for rotational and translational motion, said planetary gears being capable of varying degrees of intermeshing relation with said sun gear, said translational motion being limited so as to maintain said planetary gears at all times in an intermeshing relation with said sun gear by a rolling contact of said planetary gears with the cylindrical wall, whereby rotation of said drive shaft rotates said sun gear about its own axis and rotates said planetary gears about their own axes and the axis of said sun gear.

2. Apparatus for agitating viscous materials comprising a chamber formed of a base plate provided with a recessed portion, a port and a channel therebetween; a top plate, a cylindrical wall between said base plate and said top plate, a drive shaft extending centrally in said recessed portion of said base plate and coaxially in said chamber, means for rotating said drive shaft, a sun gear fixed on said drive shaft, a cross arm centrally pivoted on said drive shaft between said base plate and said sun gear, said cross arm having spaced apart journaling means and adjacent each of said journaling means a saddle, a plurality of planetary gears journaled in said journaling means for rotational and translational motion, said planetary gears being capable of varying degrees of intermeshing relation with said sun gear, said translational motion being limited so as to maintain said planetary gears at all times in an intermeshing relation with said sun gear by a rolling contact of said planetary gears with the cylindrical wall, whereby rotation of said drive shaft rotates said sun gear about its own axis and rotates said planetary gears about their own axes and the axis of said sun gear.

3. Apparatus for agitating viscous materials comprising a chamber formed of a base plate provided with a recessed portion, a port and a channel therebetween; a top plate, a cylindrical wall between said base plate and said top plate, a drive shaft extending centrally in said recessed portion of said base plate and coaxially in said chamber, means for rotating said drive shaft, a sun gear fixed on said drive shaft, a cross arm centrally pivoted on said drive shaft between said base plate and said sun gear, said cross arm having spaced apart journaling means and adjacent each of said journaling means a saddle and adjacent each saddle a channel extending through said cross arm leading from the zone of intermesh of the gear teeth of the said sun gear and the gear teeth of the planetary gears to the recessed portion of said base plate; said planetary gears being journaled in said journaling means for rotational and translational motion, said planetary gears being capable of varying degrees of intermeshing relation with said sun gear, said translational motion being limited so as to maintain said planetary gears at all times in an intermeshing relation with said sun gear by a rolling contact of said planetary gears with the cylindrical wall, whereby rotation of said drive shaft rotates said sun gear about its own axis and rotates said planetary gears about their own axes and the axis of said sun gear.

4. Apparatus for agitating viscous materials comprising a chamber formed of a base plate provided with temperature control means, a recessed portion, a port, and a channel therebetween, a top plate enclosing a vapor space, a cover plate fixed on said top plate; a cylindrical wall between said base plate and said top plate provided with temperature control means, and a drive shaft extending axially within said wall, means for rotating said drive shaft, a sun gear fixed on said drive shaft within said wall, an upper cross arm centrally pivoted on said drive shaft between said top plate and said sun gear, a lower cross arm centrally pivoted on said drive shaft between said base plate and said sun gear, said upper and lower cross arm having spaced apart journaling means and a raised saddle adjacent each of said journaling means, a plurality of planetary gears in mesh with said sun gear and journaled in said journaling means of said upper and lower cross arm and maintained in relative orientation thereby, said planetary gears being journaled in said journaling means for rotational and translational motion so that the degree of intermeshing relation of said planetary gears with said sun gear is variable, said translational motion being limited so as to maintain said planetary gears at all times in intermeshing relation with said sun gear by a rolling contact of said planetary gears with the cylindrical wall, whereby rotation of said drive shaft rotates said sun gear about its own axis and rotates said planetary gears about their own axes and the axis of said sun gear.

5. Apparatus for agitating viscous materials comprising a chamber formed of a base plate provided with temperature control means, a recessed portion, a port, and a channel therebetween, a top plate enclosing a vapor space, a cover plate fixed on said top plate; a cylindrical wall between said base plate and said top plate provided with temperature control means, a drive shaft extending axially within said wall, means for rotating said drive shaft, a sun gear fixed on said drive shaft within said wall, an upper cross arm centrally pivoted on said drive shaft between said top plate and said sun gear, a lower cross arm centrally pivoted on said drive shaft between said base plate and said sun gear, said upper and lower cross arm having spaced apart journaling means and a raised saddle adjacent each of said journaling means and adjacent each saddle a channel through the said lower cross arm leading from the zone of intermesh of the gear teeth of the said sun gear and the teeth of the planetary gears in mesh wtih said sun gear and journaled in said journaling means of said upper and lower cross arm and maintained in relative orientation thereby, said planetary gears being journaled in said journaling means for rotational and translational motion so that the degree of intermeshing relation of said planetary gears with said sun gear is variable, said translational motion being limited so as to maintain said planetary gears at all times in intermeshing relation with said sun gear by a rolling contact of said planetary gears with the cylindrical wall, whereby rotation of said drive shaft rotates said sun gear about its own axis and rotates said planetary gears about their own axes and the axis of said sun gear; an opening in said base plate, one end of said opening communicating with the said channel in the lower cross arm leading from the zone of intermesh to said port in the said base plate adapted by provision of an exit opening and closing means to return agitated material to the chamber and to pass said material outside the chamber by closing and opening the exit means respectively.

References Cited in the file of this patent

UNITED STATES PATENTS

| | | |
|---|---|---|
| 1,386,446 | Talley | Aug. 2, 1921 |
| 1,945,361 | Ball | Jan. 30, 1934 |
| 2,025,244 | Morehead | Dec. 24, 1935 |
| 2,501,034 | Derbyshire | Mar. 21, 1950 |
| 2,509,379 | Vasel | May 30, 1950 |
| 2,631,544 | Wilcox | Mar. 17, 1953 |
| 2,745,641 | Jacobs | May 15, 1956 |
| 2,754,542 | Henning et al. | July 17, 1956 |
| 2,785,438 | Willert | Mar. 19, 1957 |
| 2,893,268 | Liebel | July 7, 1959 |